No. 627,302. Patented June 20, 1899.
A. T. HILLMAN.
FEED WATER HEATER.
(Application filed Mar. 23, 1899.)
(No Model.)
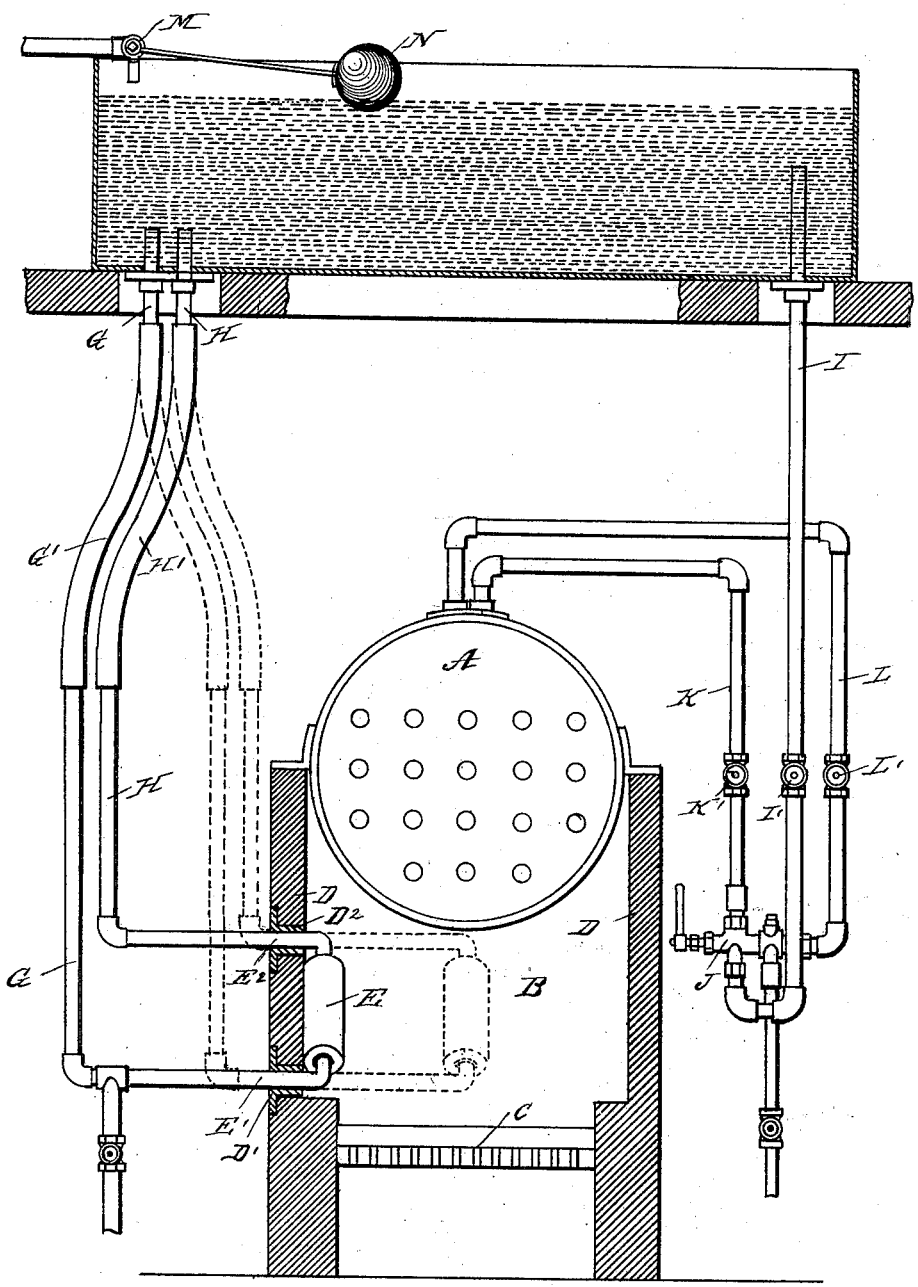
WITNESSES:
INVENTOR
Arthur T. Hillman
BY
ATTORNEY

UNITED STATES PATENT OFFICE.

ARTHUR T. HILLMAN, OF DOLGEVILLE, NEW YORK.

FEED-WATER HEATER.

SPECIFICATION forming part of Letters Patent No. 627,302, dated June 20, 1899.

Application filed March 23, 1899. Serial No. 710,152. (No model.)

*To all whom it may concern:*

Be it known that I, ARTHUR T. HILLMAN, a citizen of Canada, residing at Dolgeville, in the county of Herkimer and State of New York, have invented certain new and useful Improvements in Feed-Water Heaters, of which the following is a specification.

This invention relates to feed-water heaters for steam-boilers; and it consists in certain novel features which will be hereinafter fully described and finally embraced in the clauses of the claim.

The accompanying drawing represents a steam-boiler provided with my improvements.
A represents the boiler, and B the furnace, having grates C and walls D.

E is a heater-cylinder movably mounted in the furnace and normally situated in close proximity to one wall thereof. This cylinder is provided at its ends with two branches E' and E², running parallel with each other and extending through the furnace-wall at a right angle to the cylinder. These branches are slidably mounted in two bearings D' and D², secured in the wall.

F represents a hot-water reservoir located above the heater-cylinder and connected therewith by pipes G and H, having intermediate rubber hose G' and H', the purpose of the intermediate rubber hose being to provide a flexible connection between the heater-cylinder and the reservoir, thus permitting the said cylinder to be moved without affecting its connection with the reservoir.
I represents the hot-water discharge-pipe, which conveys the heated water into an injector J, which is provided with a steam-supply pipe K and a discharge-pipe L, through which the hot water is forced into the boiler.
I', K', and L' represent valves attached to the respective pipes connected with the injector.

The reservoir is supplied with fresh water through a faucet M, which is operated by a float N.

The heater-cylinder is adapted to normally be situated adjacent to one wall in the furnace, and thus utilize only the waste heat of the furnace and not interfere with the heating of the boiler. When, however, the water is drawn from the reservoir and its temperature suddenly reduced by the incoming cold water, the heater-cylinder is pushed into the hottest part of the furnace in order to rapidly supply the deficiency of heat in the water, and thus maintain as much as possible a uniform temperature of the water contained in the reservoir while the operation of feeding the boiler is in progress.

A steady circulation of the water is maintained in this heater, the cold water entering the pipe G and being conveyed into the lower end of the heater-cylinder, and as it is heated therein gradually rises and escapes through the pipe H into the reservoir.

In feeding the boiler the injector is started in the usual way by opening the valves of the pipes connected with same, and as the hot water is drawn from the reservoir through the pipe I the float automatically opens the faucet M, and thus permits fresh water to enter and supply the reservoir until the desired level of water has been reached.

It will be understood that this heater may be used in connection with one or several boilers. It is very efficient in operation, and as its parts are composed of ordinary pipe-fittings, with the exception of the reservoir, it may be quickly and inexpensively made and attached to any steam-boiler. It will afford a great saving in fuel and will save the boiler from the disastrous effect of cold water coming in contact with its heated surfaces.

I do not desire to limit myself to the particular construction or arrangement of parts as herein shown and described, as various changes may be made without departing from the spirit and scope of my invention.

Having thus described my invention, what I claim as new, and desire to secure by Letters Patent, is—

1. In a feed-water heater, the combination with the boiler and its furnace, a heater-cylinder mounted in the furnace, said cylinder being provided at its ends with two reduced branches running parallel with each other, and extending through the furnace-wall at a right angle to the said cylinder said branches being slidably mounted in bearings secured in said wall, a hot-water reservoir located above the heater and connected therewith by yielding circulating-pipes, said reservoir being provided with a float-operating inlet for the fresh water, and a discharge-pipe for the heated water, said pipe being connected with an injector or any other suitable boiler-feeding device, substantially as described and for the purpose set forth.

2. In a feed-water heater, the combination with the boiler and its furnace, a heater-cylinder mounted against the wall in the furnace, said cylinder being provided at its ends with two branches running parallel with each other and extending through the furnace-wall at a right angle to the said cylinder, a hot-water reservoir located above the heater-cylinder, and connected therewith by means of circulating-pipes engaging said branches of the heater-cylinder, said reservoir being provided with a float-operating inlet for the fresh water, and a discharge-pipe for the heated water said discharge-pipe being connected with an injector or any other suitable boiler-feeding device, substantially as described and for the purpose set forth.

ARTHUR T. HILLMAN.

Witnesses:
   D. E. HANLON,
   C. J. LUNDSTROM.